US012689692B2

(12) United States Patent
Won et al.

(10) Patent No.: US 12,689,692 B2
(45) Date of Patent: Jul. 21, 2026

(54) METHOD AND APPARATUS TO PREVENT DENIAL OF CALL TRANSFER

(71) Applicant: NOKIA TECHNOLOGIES OY, Espoo (FI)

(72) Inventors: Sung Hwan Won, Flower Mound, TX (US); Peter Leis, Penzberg (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 100 days.

(21) Appl. No.: 18/094,692

(22) Filed: Jan. 9, 2023

(65) Prior Publication Data
US 2023/0224409 A1     Jul. 13, 2023

(30) Foreign Application Priority Data
Jan. 7, 2022    (EP) .................................... 22150532

(51) Int. Cl.
*H04W 4/16*        (2009.01)
*H04M 3/54*        (2006.01)

(52) U.S. Cl.
CPC .................................. *H04M 3/543* (2013.01)

(58) Field of Classification Search
CPC ... H04W 4/16; H04M 2207/18; H04M 3/543; H04M 3/58; H04M 7/006; H04L 65/1094; H04L 65/1096; H04L 65/80
See application file for complete search history.

(56) References Cited

U.S. PATENT DOCUMENTS

| 2020/0288375 A1* | 9/2020 | Jia ......................... H04W 48/02 |
| 2021/0092668 A1* | 3/2021 | Zaus ..................... H04W 74/08 |
| 2021/0105647 A1* | 4/2021 | Lee ................... H04W 36/0094 |
| 2021/0392569 A1* | 12/2021 | Chen ................... H04W 68/005 |
| 2023/0422149 A1* | 12/2023 | Kim ..................... H04W 48/06 |

OTHER PUBLICATIONS

Communication under Rule 71(3) EPC dated May 10, 2024 corresponding to European Patent Application No. 22150532.4.
Extended European Search Report dated Jun. 22, 2022 corresponding to European Patent Application No. 22150532.4.
Shrawan Kumar Khatri et al., "A SIP Response Code (497) for Call Transfer Failure draft-khatri-sipcore-call-transfer-fail-response-01. txt; draft-khatri-sipcore-call-transfer-fail-response-01.txt," Network Working Group, No. 1, Jul. 27, 2021, pp. 1-11, XP015147216.

(Continued)

*Primary Examiner* — Matthew D. Anderson
*Assistant Examiner* — Dung L Lam
(74) *Attorney, Agent, or Firm* — SQUIRE PATTON BOGGS (US) LLP

(57) ABSTRACT
Techniques for preventing denial of call transfer are provided. For example, a method, comprises: indicating, in an apparatus, that a call pull is initiated; categorizing, in the apparatus, an access attempt occurred for the call pull as a mobile-terminated access attempt; and making, in the apparatus, the access attempt to a network by transmitting a message to enable a process for the call pull, wherein the message includes a cause value set according to the categorization of the access attempt. The method may be performed by a user equipment (UE).

21 Claims, 8 Drawing Sheets

(56) References Cited

OTHER PUBLICATIONS

3GPP TS 24.501 V17.4.1 (Sep. 2021), Technical Specification, 3rd Generation Partnership Project; Technical Specification Group Core Network and Terminals; Non-Access-Stratum (NAS) protocol for 5G System (5GS); Stage 3; (Release 17), Sep. 2021.

3GPP TS 24.002 V16.0.0 (Dec. 2019), Technical Specification, 3rd Generation Partnership Project; Technical Specification Group Core Network and Terminals; GSM-UMTS Public Land Mobile Network (PLMN) Access Reference Configuration (Release 16), Dec. 2019.

J. Rosenberg et al., "An Invite-Initiated Dialog Event Package for the Session Initiation Protocol (SIP)," Network Working Group, RFC 4235, Nov. 2005.

3GPP TS 24.229 V17.4.0 (Sep. 2021), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 17), Sep. 2021.

Communication under Rule 71(3) EPC dated Sep. 10, 2024, corresponding to European Patent Application No. 22 150 532.4.

Official Letter and Search Report dated Jan. 26, 2024 corresponding to Taiwan (R.O.C.) Patent Application No. 112100228, with English translation thereof.

* cited by examiner

Control Apparatus 300

Input/output interface 304

Data processing unit 303

Data processing unit 302

Memory 301

METHOD AND APPARATUS TO PREVENT DENIAL OF CALL TRANSFER

CROSS REFERENCE TO RELATED APPLICATION

This application claims the benefit of European Patent Application No. 22150532.4, filed Jan. 7, 2022. The entire content of the above-referenced application is hereby incorporated by reference.

FIELD

Various example embodiments described herein generally relate to wireless communication systems and more particularly, to wireless communication systems allowing to prevent denial of call transfer. Yet more particularly, some example embodiments provide methods and apparatuses for preventing denial of call transfer.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

In wireless telecommunication systems, there have been requirements for transfer of sessions (e.g., calls) between devices based on proprietary configurations in the device (e.g., user equipment devices). Certain developments, relating to multi-device (MuD) and multi-identity enhancements (MuDE), provide standardized mechanisms for devices to be aware of other devices and possibly address these other devices. MUD and MuDE may enable call transfer between devices and thus may meet the demand from the car industry to be able to transfer calls to built-in devices in cars (for example).

Certain developments also identified that call transfer between devices shall include both call push mechanisms, where a call is pushed from the device in a call to another device, and call pull mechanisms, where a call is pulled from the device to the other device.

In order to prevent that the call transfer is denied and thus a user is required to continue the session (e.g., the call) with the device from which the call is to be pulled from (e.g., a sub-optimal device), there is a need for mechanism(s) to be used in performing the call transfer which prevent a denial of the call transfer.

SUMMARY

According to a first aspect of the subject disclosure, a method to be performed by an apparatus in a terminal device or by the terminal device is provided. The method comprises: indicating, in the apparatus, that a call pull is initiated; categorizing, in the apparatus, an access attempt occurred for the call pull as a mobile-terminated access attempt; and making, in the apparatus, the access attempt to a network by transmitting a message to enable a process for the call pull.

In some example embodiments, the message includes a cause value set according to the categorization of the access attempt.

For example, the method may allow to prevent denial of call transfer (e.g., due to barring).

In some example embodiments, the method further comprises: indicating that the call pull is initiated in response to determining, in the apparatus, that the call pull is initiated to pull, to the first user equipment (UE), a call from a second user equipment (UE).

In some example embodiments, the method further comprises: causing, in the apparatus, the access attempt to be considered not barred based on that the access attempt is categorized as the mobile-terminated access attempt.

In some example embodiments of the method, the cause value is set to an access category representing the mobile-terminated access attempt. The access category may, for example, comprise access category 0 if the first UE is in an NG-RAN cell.

In some example embodiments of the method, the message further includes a call type. For example, the cause value may comprise an RRC establishment cause value indicating the mobile-terminated access attempt and/or the call type may comprise a call type indicating terminating calls, if the first UE is in an E-UTRAN cell.

In some example embodiments of the method, indicating that a call pull is initiated comprises indicating, from an upper layer of the apparatus to lower layers of the apparatus that the call pull is initiated.

In some example embodiments of the method, categorizing the access attempt comprises categorizing, at the lower layers, the access attempt and making the access attempt comprises making, at the lower layers, the access attempt.

In some example embodiments of the method, the lower layers comprise a first lower layer at which to categorize the access attempt and a second lower layer at which to make the access attempt, and wherein the method further comprises providing, from the first lower layer to the second lower layer, the access attempt categorized as the mobile-terminated access attempt.

In some example embodiments of the method, the upper layer comprises an application layer with an IP Multimedia Subsystem (IMS) client, the first lower layer comprises a Non-Access Stratum (NAS) layer and/or the second lower layer comprises an Access Stratum (AS) layer.

In some example embodiments, the apparatus is included in the first UE.

According to a second aspect of the subject disclosure, a method to be performed by a network device in a network is provided. The method comprises: receiving, at a network from a user equipment, a message to enable a process for a call pull; and performing an access control based on the message.

In some example embodiments, the message may include a cause value set according to categorization of an access attempt, wherein the performing an access control is based on the cause value.

In some example embodiments, the message may indicate an access attempt and the access control may be performed based on the indicated access attempt. The access attempt is for a call pull. The user equipment categorizes the access attempt as a mobile-terminated access attempt.

In some example embodiments of the method, the cause value is set to an access category representing the mobile-terminated access attempt. For example, the access category may comprise access category 0 if the first UE is in an NG-RAN cell.

In some example embodiments of the method, the message further comprises a call type. For example, the cause value may comprise an RRC establishment cause value indicating the mobile-terminated access attempt and/or the call type may comprise a call type indicating terminating calls, if the first UE is in an E-UTRAN cell.

According to a third aspect of the subject disclosure, an apparatus in a user equipment (UE) is provided. The apparatus comprises: at least one processor; and at least one memory including computer program code. The computer program code causes the apparatus, when executed with the at least one processor, to at least: indicate that a call pull is initiated; categorize an access attempt occurred for the call pull as a mobile-terminated access attempt; and make the access attempt to a network by transmitting a message to enable a process for the call pull.

In some example embodiments, the message includes a cause value set according to the categorization of the access attempt.

For example, the apparatus may allow to prevent denial of call transfer (e.g., due to barring).

In some example embodiment, the computer program code further causes the apparatus, when executed with the at least one processor, to at least: indicate that the call pull is initiated in response to determining that the call pull is initiated to pull, to the UE, a call from another user equipment (UE).

In some example embodiments, the computer program code further causes the apparatus, when executed with the at least one processor, to at least: cause the access attempt to be considered not barred based on that the access attempt is categorized as the mobile-terminated access attempt.

In some example embodiments, the cause value is set to an access category representing the mobile-terminated access attempt. The access category may, for example, comprise access category 0 if the first UE is in an NG-RAN cell.

In some example embodiments, the message further includes a call type. For example, the cause value may comprise an RRC establishment cause value indicating the mobile-terminated access attempt and/or the call type may comprise a call type indicating terminating calls, if the first UE is in an E-UTRAN cell.

In some example embodiments, the computer program code causes the apparatus, when executed with the at least one processor, to at least: indicate, from an upper layer of the apparatus to lower layers of the apparatus that the call pull is initiated.

In some example embodiments, the computer program code causes the apparatus, when executed with the at least one processor, to at least: categorize, at the lower layers, the access attempt and make, at the lower layers, the access attempt.

In some example embodiments, the lower layers comprise a first lower layer at which to categorize the access attempt and a second lower layer at which to make the access attempt. The computer program code further causes the apparatus, when executed with the at least one processor, to at least: provide, from the first lower layer to the second lower layer, the access attempt categorized as the mobile-terminated access attempt.

In some example embodiments, the upper layer comprises an application layer with an IP Multimedia Subsystem (IMS) client, the first lower layer comprises a Non-Access Stratum (NAS) layer and/or the second lower layer comprises an Access Stratum (AS) layer.

According to a fourth aspect of the subject disclosure, an apparatus in a network is provided. The apparatus comprises: at least one processor; and at least one memory including computer program code. The computer program code causes the apparatus, when executed with the at least one processor, to at least: receive, from a user equipment, a message to enable a process for the call pull; and perform an access control based on the message.

In some example embodiments, the message may include a cause value set according to categorization of an access attempt, wherein the performing an access control is based on the cause value.

In some example embodiments, the message may indicate an access attempt and the access control may be performed based on the indicated access attempt. The access attempt is for a call pull. The user equipment categorizes the access attempt as a mobile-terminated access attempt.

In some example embodiments, the cause value is set to an access category representing the mobile-terminated access attempt. For example, the access category may comprise access category 0 if the first UE is in an NG-RAN cell.

In some example embodiments, the method further includes a call type. For example, the cause value may comprise an RRC establishment cause value indicating the mobile-terminated access attempt and/or the call type may comprise a call type indicating terminating calls, if the first UE is in an E-UTRAN cell.

According to a fifth aspect of the subject disclosure, a computer program product comprises program instructions stored on a computer readable medium to execute steps according to any one of the example embodiments of the methods outlined above when said program is executed on a computer.

The above-noted aspects and features may be implemented in systems, apparatuses, methods, articles and/or non-transitory computer-readable media depending on the configuration. The subject disclosure may be implemented in and/or used with a number of different types of devices, including but not limited to cellular phones, tablet computers, wearable computing devices, portable media players, and any of various other computing devices.

This summary is intended to provide a brief overview of some of the aspects and features according to the subject disclosure. Accordingly, it will be appreciated that the above-described features are merely examples and should not be construed to narrow the scope of the subject disclosure in any way. Other features, aspects, and advantages of the subject disclosure will become apparent from the following detailed description, drawings and claims.

LIST OF ABBREVIATIONS

In the subject disclosure, the following abbreviations are used and should be understood in accordance with the given definitions:

3GPP 3$^{rd}$ Generation Partnership Project
5G 5$^{th}$ Generation (Mobile Communication Network)
5GC 5G Core
5GS 5G System
AC Access Category
AF Application Function
AMF Access and Mobility Function
AN Access Network
AS Access Stratum
BS Base Station
CDMA Code Division Multiple Access
CN Core Network
CP Control Plane
DNN Data Network Name
eNB Evolved NodeB
EPC Evolved Packet Core
ETSI European Telecommunications Standards Institute E-UTRAN Evolved UMTS Terrestrial Radio Access
IE Information Element
IMS IP Multimedia Subsystem
IP Internet Protocol
LTE Long Term Evolution
MME Mobility Management Entity
MT Mobile Terminating/Terminated
NAS Non-Access Stratum
NG-RAN Next Generation RAN
NR New Radio
PCF Policy Control Function
PDN Packet Data Network
PDP Packet Data Protocol
PGW PDN Gateway
PGW-C PGW Control Function
PLMN Public Land Mobile Network
RAN Radio Access Network
RRC Radio Resource Control (Protocol)
SGW Serving Gateway
SIM Subscriber Identity Module
SMF Session Management Function
TS Technical Specification
UE User Equipment
UMTS Universal mobile telecommunications system
URLLC Ultra-Reliable Low Latency Communication

BRIEF DESCRIPTION OF THE DRAWINGS

A better understanding of the subject disclosure can be obtained when the following detailed description of various example embodiments is considered in conjunction with the following drawings, in which.

DETAILED DESCRIPTION

Before explaining the examples in detail, certain principles of a wireless communication system and mobile communication devices are briefly explained with reference to FIGS. 1 to 3 to assist in understanding the technology underlying the described examples.

Figure 1:
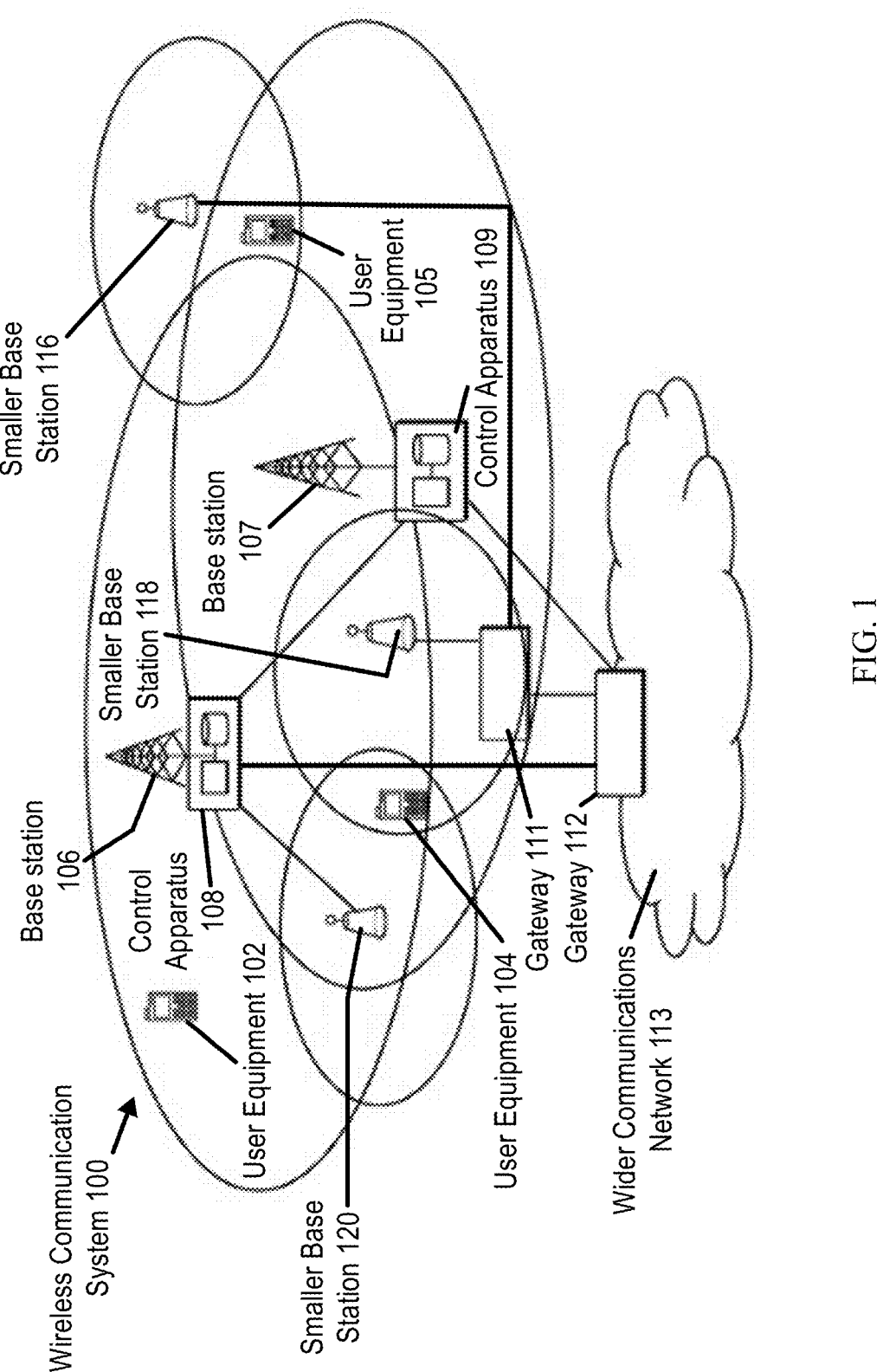
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station (e.g., next generation NB, gNB) or similar wireless transmitting and/or receiving node or point. Base stations may be controlled or assisted by at least one appropriate controller apparatus, so as to enable operation thereof and management of mobile communication devices in communication with the base stations. The controller apparatus may be located in a radio access network (e.g., wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1, base stations 106 and 107 are shown as connected to a wider communications network 113 via gateway 112. A further gateway function may be provided to connect to another network.

As used herein, the term "base station" has the full breadth of its ordinary meaning, and at least includes a wireless communication station installed at a fixed location and used to communicate as part of a wireless telephone system or radio system. The communication area (or coverage area) of the base stations may be referred to as a "cell." The base stations and the UEs may be configured to communicate over the transmission medium using any of various radio access technologies (RATs), also referred to as wireless communication technologies, or telecommunication standards described hereinbelow. As illustrated in FIG. 1, while one of the base stations may act as a "serving cell" for UEs, each UE may also be capable of receiving signals from (and possibly within communication range of) one or more other cells (which might be provided by the base stations and/or any other base stations), which may be referred to as "neighboring cells".

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some example embodiments, the smaller stations may not be provided. Smaller base stations 116, 118 and 120 may be part of a second network, for example WLAN and may be WLAN APs. The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long-term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture referred to as the Evolved Universal Terrestrial Radio Access Network (E-UTRAN) and a core network known as the Evolved Packet Core (EPC). Base stations of such systems are referred to as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a communications system is the 5G or NR concept. Network architecture in NR may be compared to that of LTE Advanced. Base stations of NR systems may be referred to as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Networks may utilize network functions virtualization (NFV) which is a network architecture concept that virtualize network node functions into "building blocks" or entities that may be operationally connected or linked together to provide services. A virtualized network function (VNF) may comprise one or more virtual machines running computer program codes using servers. Cloud computing or data storage may also be utilized. In radio communications, this may mean node operations to be carried out, at least partly, in a server, host or node operationally coupled to a remote radio head. It is also possible that node operations may be distributed among a plurality of servers, nodes or hosts. It should also be understood that the distribution of labor between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
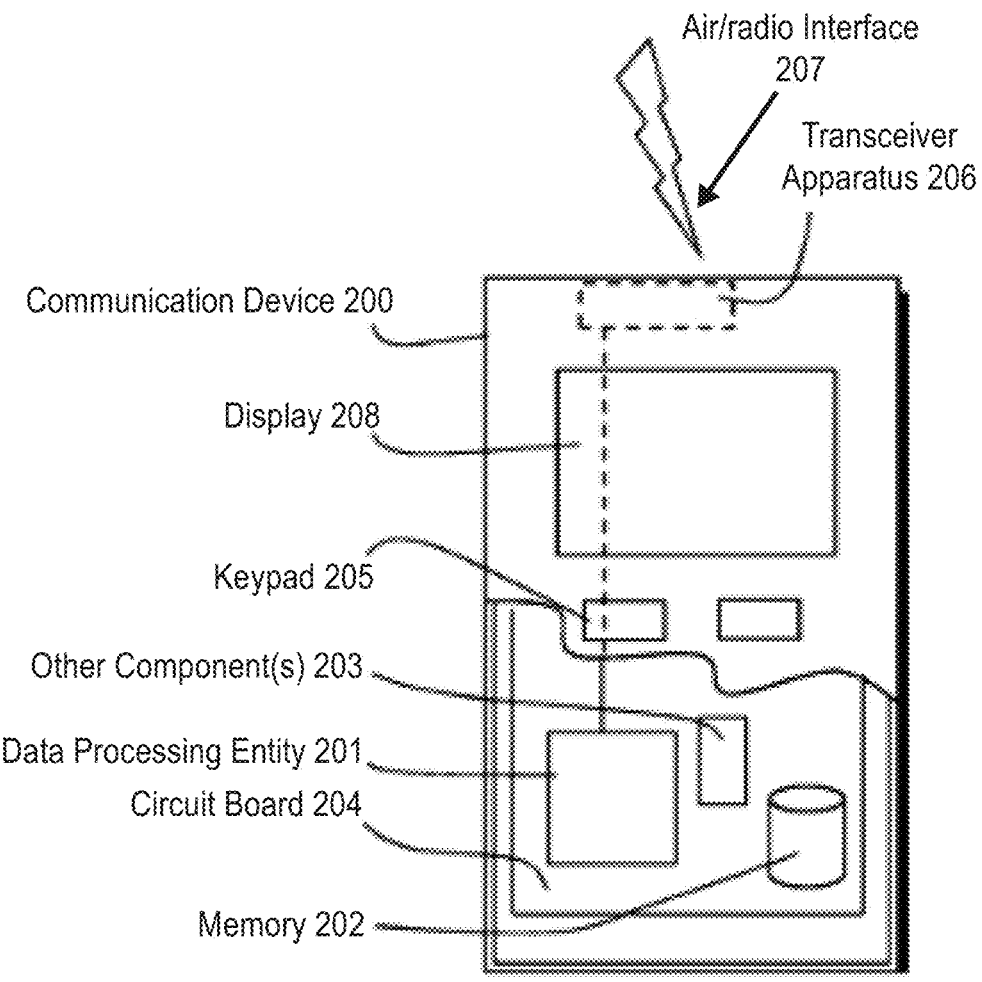
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal device. A mobile communication device may be implemented by any device capable of sending and receiving radio signals. Non-limiting examples comprise a mobile station (MS) or mobile device, such as a mobile phone or what is referred to as a smart phone, a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (e-mail), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

In an industrial application a communication device may be a modem integrated into an industrial actuator (e.g., a robot arm) and/or a modem acting as an Ethernet-hub that will act as a connection point for one or several connected Ethernet devices (which connection may be wired or unwired).

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as keypad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided, for example, by means of a radio part and associated antenna arrangement. The antenna arrangement may be arranged internally or externally to the mobile device.

The communication device 200 may additionally or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if configured. Other combinations of wireless communication standards (including more than two wireless communication standards) are also possible.

Generally, the communication device 200 illustrated in FIG. 2 includes a set of components configured to perform core functions. For example, this set of components may be implemented as a system on chip (SOC), which may include portions for various purposes. Alternatively, this set of components may be implemented as separate components or groups of components for the various purposes. The set of components may be coupled (e.g., communicatively; directly or indirectly) to various other circuits of the communication device 200.

The communication device 200 may include at least one antenna in communication with a transmitter and a receiver (e.g., the transceiver apparatus 206). Alternatively, transmit and receive antennas may be separate. The communication device 200 may also include a processor (e.g., the at least one data processing entity 201) configured to provide signals to and receive signals from the transmitter and receiver, respectively, and to control the functioning of the communication device 200. The processor may be configured to control the functioning of the transmitter and receiver by effecting control signaling via electrical leads to the transmitter and receiver. Likewise, the processor may be configured to control other elements of the communication device 200 by effecting control signaling via electrical leads connecting processor to the other elements, such as a display (e.g., display 208) or a memory (e.g., the at least one memory 202). The processor may, for example, be implemented in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, in some examples, the processor may comprise a plurality of processors or processing cores.

The communication device 200 may be capable of operating with one or more air interface standards, communication protocols, modulation types, access types, and/or the like. Signals sent and received by the processor may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the communication device 200 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like). For example, the communication device 200 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the communication device 200 may be capable of operating in accordance with 2.5G wireless communication protocols General Packet Radio Service (GPRS), Enhanced Data GSM Environment (EDGE), and/or the like. Further, for example, the communication device 200 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD- SCDMA), and/or the like. The communication device 200 may be additionally capable of operating in accordance with 3.9G wireless communication protocols, such as Long-Term Evolution (LTE), Evolved Universal Terrestrial Radio Access Network (E-UTRAN), and/or the like. Additionally, for example, the communication device 200 may be capable of operating in accordance with 4G wireless communication protocols, such as LTE Advanced, 5G, and/or the like as well as similar wireless communication protocols that may be subsequently developed.

It is understood that the processor may include circuitry for implementing audio/video and logic functions of the communication device 200. For example, the processor may comprise a digital signal processor device, a microprocessor device, an analog-to-digital converter, a digital-to-analog converter, and/or the like. Control and signal processing functions of the communication device 200 may be allocated between these devices according to their respective capabilities. The processor may additionally comprise an internal voice coder (VC), an internal data modem (DM), and/or the like. Further, the processor may include functionality to operate one or more software programs, which may be stored in memory. In general, the processor and stored software instructions may be configured to cause the communication device 200 to perform actions. For example, the processor may be capable of operating a connectivity program, such as a web browser. The connectivity program may allow the communication device 200 to transmit and receive web content, such as location-based content, according to a protocol, such as wireless application protocol (WAP), hypertext transfer protocol (HTTP), and/or the like.

The communication device 200 may also comprise a user interface including, for example, an earphone or speaker, a ringer, a microphone, a display, a user input interface, and/or the like, which may be operationally coupled to the processor. The display may, as noted above, include a touch sensitive display, where a user may touch and/or gesture to make selections, enter values, and/or the like. The processor may also include user interface circuitry configured to control at least some functions of one or more elements of the user interface, such as the speaker, the ringer, the microphone, the display, and/or the like. The processor and/or user interface circuitry comprising the processor may be configured to control one or more functions of one or more elements of the user interface through computer program instructions, for example, software and/or firmware, stored on a memory accessible to the processor, for example, volatile memory, non-volatile memory, and/or the like. The communication device 200 may include a battery for powering various circuits related to the mobile terminal, for example, a circuit to provide mechanical vibration as a detectable output. The user input interface may comprise devices allowing the communication device 200 to receive data, such as a keypad (e.g., keypad 205) and/or other input devices. The keypad can also be a virtual keyboard presented on display or an externally coupled keyboard.

The communication device 200 may also include one or more mechanisms for sharing and/or obtaining data. For example, the communication device 200 may include a short-range radio frequency (RF) transceiver and/or interrogator, so data may be shared with and/or obtained from electronic devices in accordance with RF techniques. The communication device 200 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. The communication device 200 and, in particular, the short-range transceiver may be capable of transmitting data to and/or receiving data from electronic devices within the proximity of the apparatus, such as within 10 meters, for example. The communication device 200 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The communication device 200 may comprise memory, such as one or more Subscriber Identity Modules (SIM), one or more Universal Subscriber Identity Modules (USIM), one or more removable User Identity Modules (R-UIM), one or more eUICC, one or more UICC, and/or the like, which may store information elements related to a mobile subscriber. In addition, the communication device 200 may include other removable and/or fixed memory. The communication device 200 may include volatile memory and/or non-volatile memory. For example, the volatile memory may include Random Access Memory (RAM) including dynamic and/or static RAM, on-chip or off-chip cache memory, and/or the like. The non-volatile memory, which may be embedded and/or removable, may include, for example, read-only memory, flash memory, magnetic storage devices, for example, hard disks, floppy disk drives, magnetic tape, optical disc drives and/or media, non-volatile random-access memory (NVRAM), and/or the like. Like volatile memory, the non-volatile memory may include a cache area for temporary storage of data. At least part of the volatile and/or non-volatile memory may be embedded in the processor. The memories may store one or more software programs, instructions, pieces of information, data, and/or the like which may be used by the apparatus for performing operations disclosed herein.

The memories may comprise an identifier, such as an International Mobile Equipment Identification (IMEI) code, capable of uniquely identifying the communication device 200. The memories may comprise an identifier, such as an international mobile equipment identification (IMEI) code, capable of uniquely identifying the communication device 200. In some example embodiments, the processor may be configured using computer code stored at memory to cause the processor to perform operations disclosed herein.

Some of the example embodiments disclosed herein may be implemented in software, hardware, application logic, or a combination of software, hardware, and application logic. The software, application logic, and/or hardware may reside on the memory, the processor, or electronic components, for example. In some example embodiments, the application logic, software or an instruction set is maintained on any one of various computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 2, computer-readable medium may comprise a non-transitory computer-readable storage medium that may be any media that can contain or store the instructions for use by or in connection with an instruction execution system, apparatus, or device, such as a computer.

In some example embodiments, the communication device 200 (i.e., a user equipment (UE) in a network) comprises the processor (e.g., the at least one data processing entity 201) and the memory (e.g., the at least one memory 202). The memory includes computer program code causing the communication device 200 to perform processing according to one or more of the methods described below with reference to FIGS. 5 and 6.

Figure 3:
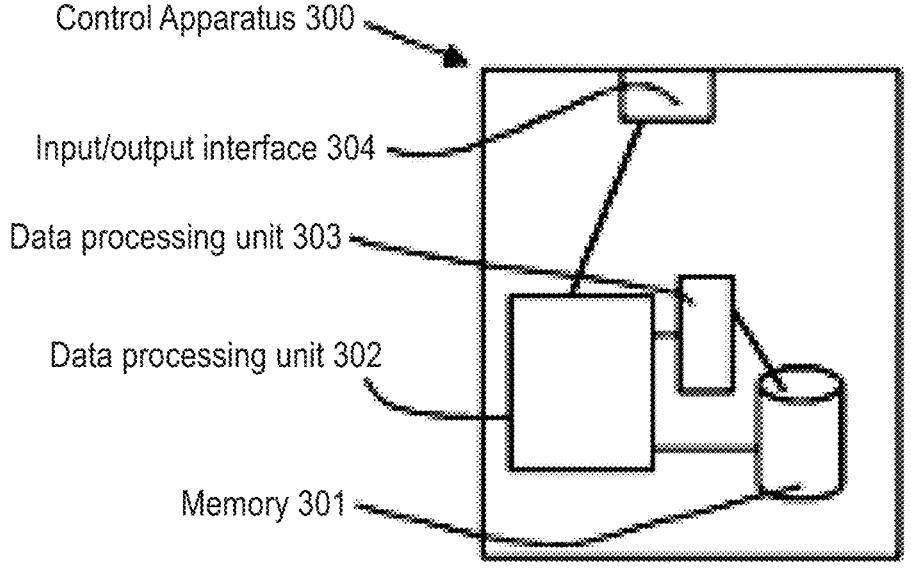
FIG. 3 shows a schematic diagram of an example control apparatus.

FIG. 3 shows an example embodiment of a control apparatus for a communication system, for example to be coupled to and/or for controlling a station of an access system, such as a RAN node, e.g., a base station, eNB or gNB, a relay node or a core network node such as an MME or S-GW or P-GW, or a core network function such as AMF/SMF, or a server or host. The method may be implanted in a single control apparatus or across more than one control apparatus. The control apparatus may be integrated with or external to a node or module of a core network or RAN. In some example embodiments, base stations comprise a separate control apparatus unit or module. In other example embodiments, the control apparatus can be another network element, such as a radio network controller or a spectrum controller. In some example embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface, the control apparatus can be coupled to a receiver and a transmitter of the base station. The receiver and/or the transmitter may be implemented as a radio front end or a remote radio head.

Generally, the control apparatus 300 has an antenna, which transmits and receives radio signals. A radio frequency (RF) transceiver module, coupled with the antenna, receives RF signals from antenna, converts them to baseband signals and sends them to processor (e.g., the at least one data processing unit 302, 303). RF transceiver also converts received baseband signals from processor, converts them to RF signals, and sends out to antenna. Processor processes the received baseband signals and invokes different functional modules to perform features in control apparatus 300. Memory (e.g., the at least one memory 301) stores program instructions and data to control the operations of the control apparatus 300. In the example of FIG. 3, the control apparatus 300 also includes protocol stack and a set of control functional modules and circuit. PDU session handling circuit handles PDU session establishment and modification procedures. Policy control module that configures policy rules for UE. Configuration and control circuit provides different parameters to configure and control UE of related functionalities including mobility management and session management. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

In some example embodiments, the control apparatus 300 (i.e., the base station or the wireless transmitting and/or receiving point equipment) comprises the processor (e.g., the at least one data processing unit 302, 303) and the memory (e.g., the at least one memory 301). The memory includes computer program code causing the control apparatus 300 to perform processing according to the method described below with reference to FIG. 7.

Before referring to FIGS. 4 to 8 and describing the methods to prevent denial of call transfer according to some example embodiments of the subject disclosure, some additional information and aspects pertaining to the subject disclosure will be provided.

As already mentioned above, call pull/push mechanisms have been identified for the call transfer based on the recent developments relating to MuD and MuDE.

Certain developments identified that call transfer between devices shall include both call push mechanisms, where a call is pushed from the device in a call to another device, and call pull mechanisms, where a call is pulled from the device to the other device.

In order to prevent that the call transfer is denied and thus a user is required to continue the session (e.g., the call) with the device from which the call is to be pulled from (e.g., a sub-optimal device), there is a need for mechanisms to be used in performing the call transfer which prevent a denial of the call transfer.

A call pull procedure for a user equipment (UE) to take over an ongoing session (e.g., an ongoing call) from another UE in a set of federated UEs will now be described with reference to FIG. 4. The set of federated UEs may comprise a group of UEs configured to use the same public user identity.

In step 1, a call (or more generally, a session) is initiated (e.g., user initiated, machine initiated, and so forth) between a user equipment (referred to as a second user equipment UE 2) to another user equipment (referred to as another user equipment UE X) via one or more networks (referred to as the network(s)). While the call is ongoing, for example, it is decided (e.g., by a user of UE 2) at step 2 to transfer the call from UE 2 to yet another user equipment (referred to as the first user equipment UE 1) by pulling the call from UE 2. In response to deciding to pull the call, UE 1 sends an access attempt to the network(s) at step 3. The network(s) receiving the access attempt coordinates the transfer of the call by performing corresponding signaling to the UEs (i.e., UE 2 and UE X) participating the call and also UE 1 at step 4. The signaling results in that the call is transferred from UE 2 to UE 1 and continued between UE 1 and UE X via the network(s) at step 5.

In response to deciding to pull the call, UE 2 may perform a barring check before making the access attempt to the network(s) in step 3. The barring check may result in that to pull the call is "not barred" (i.e., to pull the call is allowed) and thus can be done in accordance with the procedure of FIG. 4, i.e., the access attempt is made to the network(s). However, if the result of the barring check is "barred" (i.e., to pull the call is not allowed), UE 1 is prohibited from making the access attempt toward the network(s). That is, UE 1 is not allowed to make the access attempt to toward the network(s). As a result, the call pull fails and the call will continue between UE 2 and UE X.

The subject disclosure provides a method to prevent denial of transfer of the call.

Now, the methods to prevent denial of call transfer according to some example embodiments of the subject disclosure will be described.

Figure 5:
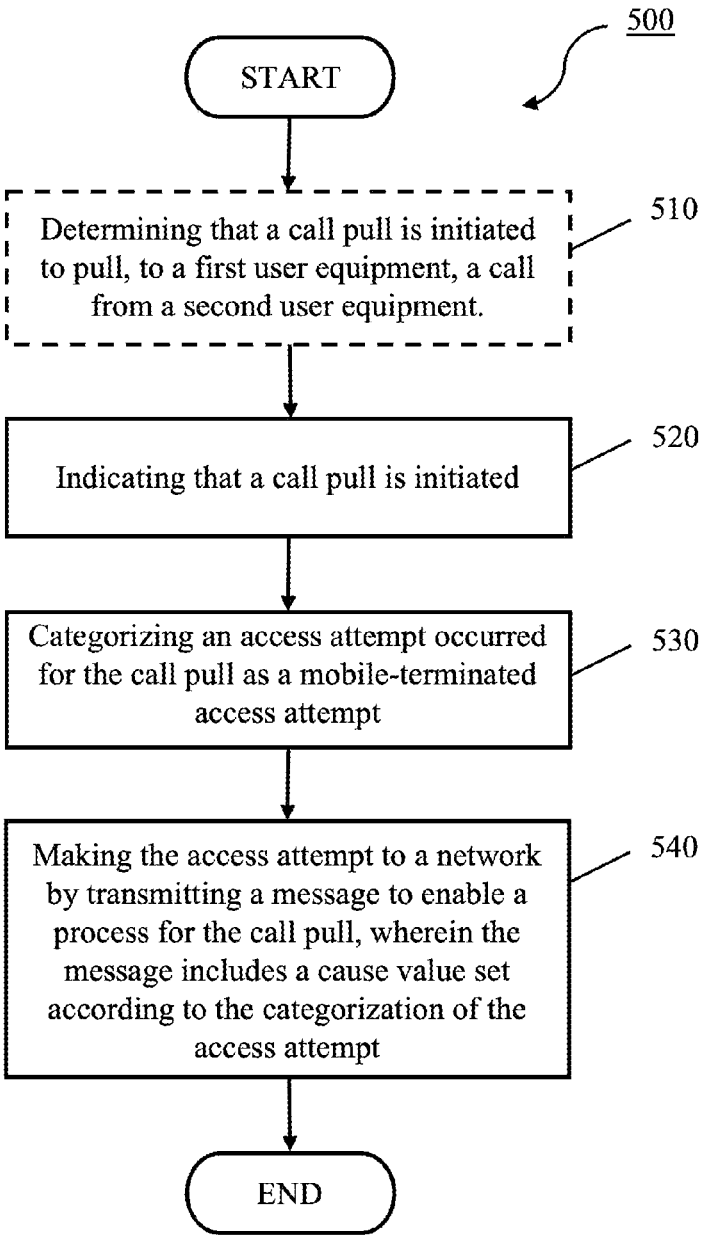
FIGS. 5 to 7 illustrate flow charts of methods for preventing denial of call transfer according to some example embodiments.

FIG. 5 illustrates a flow chart of a method to prevent denial of call transfer according to some example embodiments. The method 500 is performed by a user equipment (UE) or by an apparatus in the UE. For example, the UE may be represented by any one of the mobile communication devices 102, 104, 105 of the wireless communication system

100 as described above with reference to FIG. 1, or the communication device 200 as described above with reference to FIG. 2.

As described above, a call is initiated (e.g., user initiated, machine initiated, and so forth) between the second UE (UE 2) and another UE (UE X) via the network(s). While the call is ongoing, for example, it may be decided to transfer the call from the second UE to the first UE. For example, the user may decide to transfer the call from a handheld mobile device to a mobile device in the user's car. The transfer of the call is to be done by pulling the call from the second UE to the first UE. For example, while the call is ongoing (step 1 in FIG. 4), the user of the first UE and the second UE decides to pull the call using the second UE (step 2 in FIG. 4). Before making the access attempt to the network (step 3 in FIG. 4), the method to prevent denial of transfer of the call according to some example embodiments is performed.

The method starts at block 520 with indicating that the call pull is initiated. That is, the apparatus in the first UE (i.e., UE 1) performs processing related to the initiation of the call pull. The processing involves that the initiation of the call pull is to be handled by the apparatus, for example, in accordance with a layered architecture of the apparatus. In some examples, as will be described in more detail hereinbelow, the initiation of the call pull is indicated from upper layers to lower layers of the layered architecture of the apparatus.

The indication at block 520 may, in some examples, be performed in response to determining at optional block 510 that the call pull for pulling the call from the second UE (i.e., UE 2) to the first UE is initiated. The determination may be based on the decision (e.g., user decision, machine decision, and so forth) to pull the call using the second UE. For example, the user may provide an instruction for the call pull to the first UE, possibly together with the selection of the second UE (e.g., selection of one UE among federated UEs of the user). In the context of the subject disclosure, federated UEs concerns a group of UEs which are configured to use the same public user identity. The instruction may have the form of pushing a button of the first UE, touching on a given region on a touch-sensitive display of the first UE, providing a voice command via a microphone of the first UE, a result of an automated logic-based decision, or the like. That is, the apparatus in the first UE determines that the instruction for the call pull using the second UE was given (or entered).

At block 530, the apparatus categorized an access attempt occurred for the call pull as a mobile-terminated access attempt. That is, in response to receiving the indication that the call pull is initiated, the access attempt (i.e., the access attempt related to the call pull) is prepared in a way such that the access attempt is considered to be occurred due to a request that is to be terminated on or delivered to the first UE (i.e., the request terminated at the first UE). Thus, in some examples, the access attempt categorized to be mobile-terminated causes the apparatus to consider that the access attempt occurred due to mobile-terminated request and therefore as not barred. The apparatus may categorize the access attempt using a mapping.

The apparatus then makes the access attempt to the network, at block 540. For example, the apparatus makes the access attempt by transmitting a message to the network. The message may indicate the access attempt or the message may include a cause value set according to the categorization of the access attempt.

In some examples, the access attempt for the call pull may be mapped to an access category representing the mobile-terminated access attempt. The cause value may be set to the access category representing the mobile-terminated access attempt. For example, in case the first UE is registered in an NG-RAN cell, the access category corresponds to access category 0 in accordance with 3GPP TS 24.501.

In other examples, the access attempt for the call pull may be mapped to a cause value and/or a call type. In such examples, the message to be transmitted to the network may further comprise the call type. For example, in case the first UE is registered in an E-UTRAN cell, the cause value corresponds to an RRC establishment cause value indicating the mobile-terminated access attempt and/or the call type corresponds to a call type indicating terminating calls in accordance with 3GPP TS 24.501.

As a result, categorizing the access attempt occurred for the call pull as the mobile-terminated access attempt causes the apparatus and thus the first UE to consider that the access attempt occurred due to mobile-terminated request. This prevents a denial of call transfer, for example, as a barring check for the access attempt (not mapped to mobile-terminated) may result in that the access attempt is barred, resulting in that the call pull fails.

Figure 6:
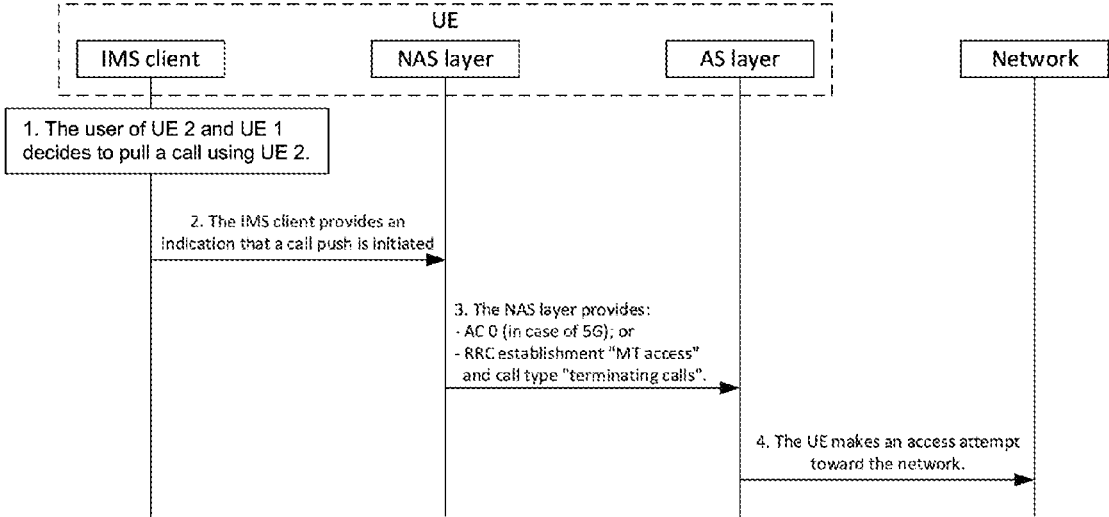

Referring to FIG. 6, the method to prevent denial of call transfer will now be described with respect to a layered architecture of the apparatus. FIG. 6 illustrates a flow chart of the method to prevent denial of call transfer according to some example embodiments. Again, the method is performed by a user equipment (UE) or by an apparatus in the UE.

As illustrated in FIG. 6, the layered architecture of the apparatus comprises at least an upper layer, such as an application layer and lower layers. The upper layer may include an IP Multimedia Subsystem (IMS) client (the upper layer is referred to as IMS client hereinbelow). That is, the apparatus comprises the IMS client at the application layer. The lower layers may include a first lower layer, such as a Non-Access Stratum (NAS) layer (the first lower layer is referred to as NAS layer hereinbelow), and a second lower layer, such as an Access Stratum (AS) layer (the second lower layer is referred to as AS layer hereinbelow).

When the call pull is initiated with the first UE as described above with reference to block 510 shown in FIG. 5, the IMS client indicates to lower layers that a call pull is initiated (started). More specifically, in response to the decision (e.g., user decision, machine-based decision, and so forth) to pull the call at step 1, the IMS client provides, at step 2, an indication that the call pull is initiated to the NAS layer. At step 3, the lower layers or more specifically the NAS layer maps an access attempt occurred for the call pull to indicate the access attempt to be mobile-terminated (i.e., the NAS layer categorizes that access attempt as the mobile-terminated access attempt). For example, the NAS layer may map the access attempt to an access category representing that the access attempt is for mobile-terminated access (e.g., Access Category 0 which represents that the access attempt is for mobile-terminated access, if the first UE is registered in an NG-RAN cell). In another example, the NAS layer may map the access attempt to a cause value and/or a call type (e.g., an RRC establishment cause value indicating mobile-terminated access and/or a call type indicating terminating calls, if the first UE is registered in an E-UTRAN cell). Also at step 3, the NAS layer may, in some examples, provide the access attempt mapped to indicate mobile-terminated to the AS layer. That is, the NAS layer may provide {Access Category 0} or {RRC establishment cause "MT access", call type "terminating calls"} to the AS layer. The AS layer receiving the access attempt considers that the access attempt occurred due to mobile-terminated request, avoiding that the access attempt is barred and thus preventing denial of call transfer. Finally, at step 4, the UE (e.g., the AS layer) makes the access attempt to the network by transmitting a message to the network. The message may include the access attempt. More specifically, the message may include a cause value set according to the categorization of the access attempt. The cause value may comprise, set to, or represent, an access category representing the mobile-terminated access attempt. In other examples, the cause value comprises a cause value and/or a call type.

As described above, the access attempt for call pull may be mapped to an access category or RRC establishment cause value/call type already defined in 3GPP TS 24.501. However, the access attempt for call pull may also be mapped to a new access category or RRC establishment cause value/call type specifically relating to call pull. The new access category or RRC establishment cause value/call type exempt from access control may also be used.

For example, the mapping table according to 3GPP TS 24.501 to be used by the NAS layer in case the first UE is registered in an NG-RAN cell may include the following definition relating to Access Category 0:

| Rule # | Type of access attempt | Requirements to be met | Access Category |
|---|---|---|---|
| 1 | Response to paging or NOTIFICATION over non-3GPP access; 5GMM connection management procedure initiated for the purpose of transporting an LPP message without an ongoing 5GC-MO-LR procedure; Access attempt to handover of ongoing MMTEL voice call, MMTEL video call or SMSoIP from non-3GPP access; Access attempt to pull an MMTEL voice call or an MMTEL video call from another federated UE (see 3GPP TS 24.174) | Access attempt is for MT access, handover of ongoing MMTEL voice call, MMTEL video call or SMSoIP from non-3GPP access, or call pull (3GPP TS 24.174) | 0 (=MT_acc) |

In other words, the Access Category 0 is used in case of a call pull and thus is of the type "Access attempt to pull an MMTEL voice call or an MMTEL video call from another federated UE" (the other federated UE is the second UE).

For example, the mapping table according to 3GPP TS 24.501 to be used by the NAS layer in case the first UE is registered in an E-UTRAN may include the following definition relating to RRC establishment cause value and/or call type:

| NAS procedure | RRC establishment cause (according 3GPP TS 36.331) | Call type |
|---|---|---|
| Tracking Area Update | If the UE does not have a PDN connection established for emergency bearer services and is not initiating a PDN | "terminating calls" |

-continued

| NAS procedure | RRC establishment cause (according 3GPP TS 36.331) | Call type |
|---|---|---|
| | CONNECTIVITY REQUEST that has request type set to "emergency" or "handover of emergency bearer services", and a TRACKING AREA UPDATE REQUEST is triggered upon receiving a call-pull-initiated indication from the upper layers (see 3GPP TS 24.174), the RRC establishment cause shall be set to MT access. | |
| Service Request | If a SERVICE REQUEST is triggered upon receiving a call-pull-initiated indication from the upper layers (see 3GPP TS 24.174), the RRC establishment cause shall be set to MT access. | "terminating calls" |

In other words, the RRC establishment cause set to mobile-terminated (MT) access and the call type set to "terminating calls" are to be used in case of a call pull.

Figure 4:
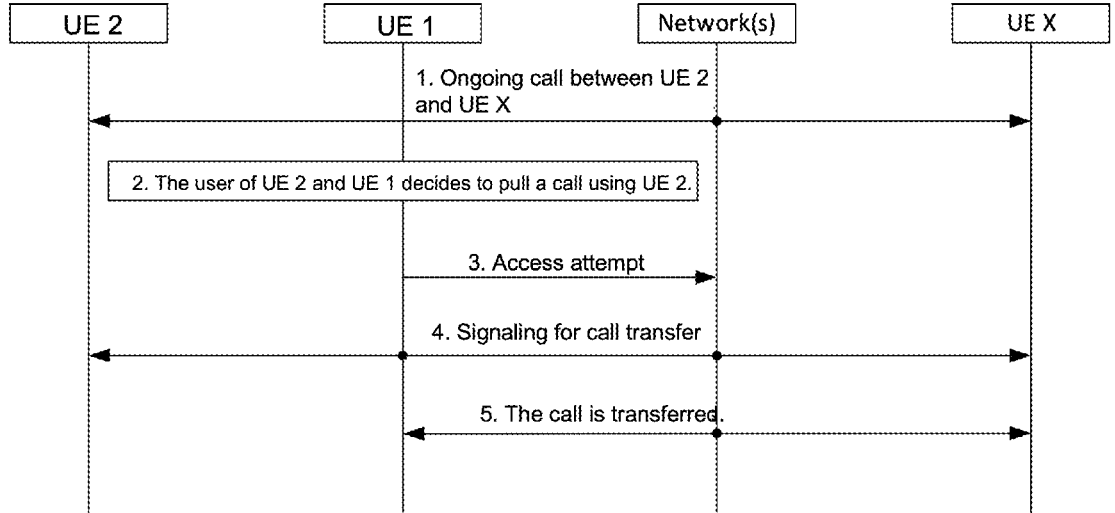
FIG. 4 illustrates a flow chart for call transfer.

As described above, in response to receiving, at the network, the access attempt from the first UE (step 3 in FIG. 4), the network may initiate signaling for call transfer to UEs involved, e.g., the first UE, the second UE and optionally also the other UE with which the call is ongoing (i.e., UE X) (step 4 in FIG. 4). After the access attempt from the first UE (step 3 in FIG. 4), the first UE may signal (e.g., send an INVITE message) to the second UE (step 4 in FIG. 4). In response to the INVITE message from the first UE, the second UE may reply (step 4 in FIG. 4) to the first UE with signaling (e.g., "200 OK" response if successful). As a result of the signaling, the call is transferred (step 5 in FIG. 5) and will be proceed further between the first UE and the other UE via the network(s).

Figure 7:
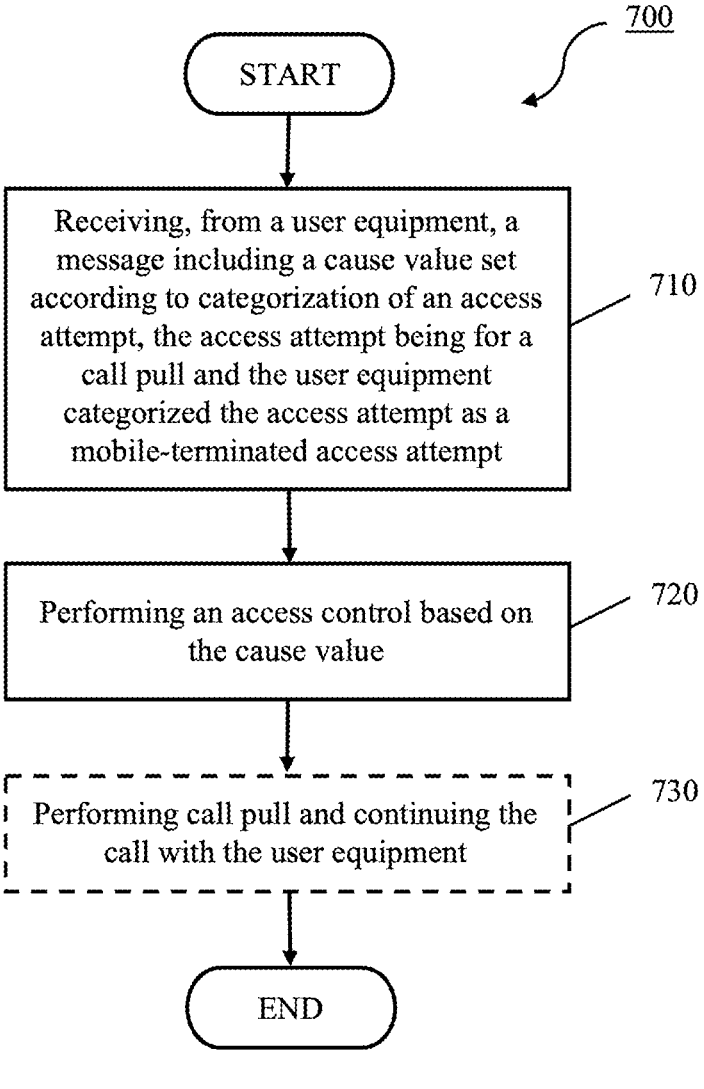

FIG. 7 illustrates a flow chart of a method prevent denial of call transfer according to some example embodiments. The method 700 is performed by the network. More specifically, the method may be performed by a base station, such as the base station represented by the control apparatus 300 as described above with reference to FIG. 3 or by an apparatus in the base station. The base station may be a serving base station, or a gNB or a transmission/reception point (TRP) in a 5GS. Generally, the method may be performed at a core network function such as AMF.

As described above, a call is initiated (e.g., user initiated, machine initiated, and so forth) between the second UE (UE 2) to another user equipment (UE X) via the network(s). While the call is ongoing, the user may, for example, decide to transfer the call from the second UE to the first UE. The transfer of the call is to be done by pulling the call from the second UE to the first UE. The steps performed by the first UE in response to the user deciding to pull the call are described with reference to FIGS. 5 and 6. Among the steps, the first UE sends a message or an access attempt to the network(s) (step 3 in FIG. 4) according to some example embodiments.

At block 710, the network receives the access attempt or the message from the first UE (UE 1). The message may indicate the access attempt or the message may include a cause value set according to categorization of the access attempt. The access attempt is a call pull to pull a call from the second UE (UE 2) to the first UE. The access attempt is categorized, by the first UE, as mobile-terminated access attempt. As described above in more detailed, the access attempt may be categorized by mapping the access attempt to mobile-terminated.

In some examples, the access attempt for the call pull may be mapped to an access category representing the mobile-terminated access attempt. In these examples, the cause value in the message is set to the access category representing the mobile-terminated access attempt. For example, the access category may comprise access category 0 if UE 1 is in an NG-RAN cell. Using the access category and one or more access identities, the first UE can determine an RRC establishment cause.

In other examples, the access attempt for the call pull may be mapped to a cause value and/or a call type. In such examples, the message may further comprise the call type. For example, the cause value may comprise an RRC establishment cause value indicating the mobile-terminated access attempt and/or the call type may comprise a call type indicating terminating calls, if the first UE is in an E-UTRAN cell.

In response to receiving the access attempt or the message, the network performs an access control based on the message at block 720. More specifically, the network may perform the access control based on the access attempt indicated in the message or based on the cause value set according to the categorization of the access attempt. The network may further perform signaling for call transfer to the first UE, the second UE and optionally also the other UE (UE X). As described with respect to FIG. 6, the UEs may perform processing for transferring the call in accordance with signaling, and the UEs may also acknowledge call transfer. As a result, the call is transferred (i.e., pull) from the second UE to the first UE and will be continued at block 730 between the first UE and the other UE via the network(s).

Figure 8:
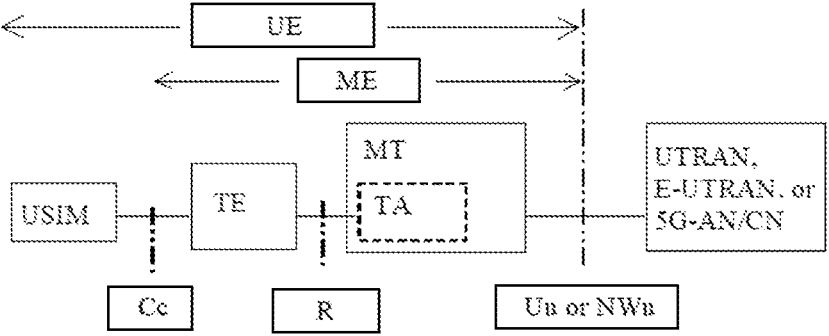
FIG. 8 illustrates a PLMN Access Reference Configuration according to 3GPP TS 24.002.

FIG. 8 illustrates a PLMN Access Reference Configuration in accordance with 3GPP TS 24.002. The method to prevent denial of call transfer according to example embodiments of the subject disclosure concerns the interaction between the Mobile Termination (shown as MT in FIG. 8) and the Terminal Equipment (shown as TE in FIG. 8). For example, the subject disclosure may relate to the R interface between the MT and the TE.

In accordance with the subject disclosure, the UE (i.e., the first UE) may pull a session (e.g., a call) from another federated UE (i.e., the second UE) by performing the following steps of the call handling procedure:

a) the UE learns about the session to pull by subscribing to the dialog event package, specified in RFC 4235;

b) the UE sends an INVITE request towards the far end populated as follows:

1) the Request-URI is set to the URI in the <target> element of the <remote> element;

2) a Replaces header field containing the dialog identifiers contained as attributes in the <dialog> element of the <dialog-info> element; and 3) any other header field or body as determined by the service logic.

In addition, the UE provides a call-pull-initiated indication to the lower layers; and c) when the UE receives a response to the INVITE request above the UE follows general procedures in 3GPP TS 24.229.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst example embodiments have been described in relation to LTE and 5G NR, principles can be adapted and applied in relation to other networks and communication systems where enforcing fast connection re-establishment is required. Therefore, although certain example embodiments were described above by way of example with reference to certain example architectures for wireless networks, technologies and standards, example embodiments may be applied to any other forms of communication systems than those illustrated and described herein.

It is also noted herein that while the above describes example embodiments, there are several variations and modifications which may be made to the disclosed solution without departing from the scope of the subject disclosure.

In general, the various example embodiments may be implemented in hardware or special purpose circuits, software, logic or any combination thereof. Some aspects of the subject disclosure may be implemented in hardware, while other aspects may be implemented in firmware or software which may be executed by a controller, microprocessor or other computing device, although the subject disclosure is not limited thereto. While various aspects of the subject disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Example embodiments of the subject disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out example embodiments. The one or more computer-executable components may be at least one software code or portions of it.

Further in this regard it should be noted that any blocks of the logic flow as in the figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general-purpose computers, special purpose computers, microprocessors, digital signal processors (DSPs), application specific integrated circuits (ASICs), FPGA, gate level circuits and processors based on multi-core processor architecture, as non-limiting examples.

Example embodiments of the subject disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Some example embodiments of the subject disclosure may be summarized as follows:

According to a first aspect, a method comprises: indicating, in an apparatus, that a call pull is initiated; categorizing, in the apparatus, an access attempt occurred for the call pull as a mobile-terminated access attempt; and making, in the apparatus, the access attempt to a network by transmitting a message to enable a process for the call pull. In some examples of the first aspect, the message may indicate the access attempt or the message may include a cause value set according to the categorization of the access attempt.

In a first example of the first aspect, the method further comprises: indicating that the call pull is initiated in response to determining, in the apparatus, that the call pull is initiated to pull, to the first user equipment (UE), a call from a second user equipment (UE).

In a second example of the first aspect, the method further comprises: causing, in the apparatus, the access attempt to be considered not barred based on that the access attempt is categorized as the mobile-terminated access attempt.

In a third example of the first aspect, the cause value is set to an access category representing the mobile-terminated access attempt. The access category of the third example may comprise access category 0 if the first UE is in an NG-RAN cell.

In a fourth example of the first aspect, the message further includes a call type. The cause value of the fourth example may comprise an RRC establishment cause value indicating the mobile-terminated access attempt and/or the call type of the fourth example may comprise a call type indicating terminating calls, if the first UE is in an E-UTRAN cell.

In a fifth example of the first aspect, indicating that a call pull is initiated comprises indicating, from an upper layer of the apparatus to lower layers of the apparatus that the call pull is initiated.

In the fifth example, mapping the access attempt may comprise categorizing, at the lower layers, the access attempt and making the access attempt comprises making, at the lower layers, the access attempt.

In the fifth example, the lower layers may comprise a first lower layer at which to categorize the access attempt and a second lower layer at which to make the access attempt. And, the method may further comprise providing, from the first lower layer to the second lower layer, the access attempt categorized as the mobile-terminated access attempt.

In the fifth example, the upper layer comprises an application layer with an IP Multimedia Subsystem (IMS) client, the first lower layer comprises a Non-Access Stratum (NAS) layer and/or the second lower layer comprises an Access Stratum (AS) layer. The method may further comprise authorizing, by the AS layer, to pull the call.

In a sixth example of the first aspect, the method further comprises receiving, from the network, signaling for transfer of the call. And, the method may further comprise initiating the transfer of the call and providing, to the network, a response relating to the transfer of the call.

In a seventh example of the first aspect, the method further comprises performing, via the network, the call with another user equipment.

In an eighth example of the first aspect, the first UE comprises a federated UE. The federated UE may be a UE in a group of UEs which are configured to use the same public user identity.

In a nineth example of the first aspect, the method further comprises sending, from the first UE to the second UE, an INVITE message. In the INVITE message, the Request-URI may be set to the URI in a target element of a remote element, a replaces header field containing dialog identifiers contained as attributes in a dialog element of a dialog-info element, and any other header field or body as determined by service logic. Also, the method may further comprise learning, by the apparatus, about the call to pull by subscribing to a dialog event package and/or receiving, at the first UE from the second UE, a response to the INVITE message. The response to the INVITE message may be a reply with 200 OK.

According to a variant of the first aspect, a method comprises: indicating, in an apparatus, that a call pull is initiated; mapping, in the apparatus, an access attempt occurred for the call pull to indicate the access attempt to be mobile-terminated; and transmitting, in the apparatus, a message indicating the access attempt toward a network.

In a first example of the variant of the first aspect, mapping the access attempt comprises mapping the access attempt for the call pull to an access category representing that the access attempt is for mobile-terminated access. The access category of the first example may comprise access category 0 if the first UE is in an NG-RAN cell.

In a second example of the variant of the first aspect, mapping the access attempt comprises mapping the access attempt for the call pull to a cause value and/or a call type. The cause value of the second example may comprise an RRC establishment cause value indicating mobile-terminated access and/or the call type of the second example may comprise a call type indicating terminating calls, if the first UE is in an E-UTRAN cell.

Other examples of the variant of the first aspect correspond to one or more examples of the first aspect.

In a tenth example of the first aspect, the apparatus is included in the first UE.

According to a second aspect, a method comprises: receiving, at a network from a user equipment, a message including a cause value set according to categorization of an access attempt; and performing an access control based on the cause value. In a variant of the second aspect, the message indicates an access attempt and an access control is based on the indicated access attempt. The access attempt is for a call pull. And, the user equipment categorizes the access attempt as a mobile-terminated access attempt (i.e., the access attempt may be mapped to the mobile-terminated access attempt).

In a first example of the second aspect, the access attempt comprises an access attempt for the call pull mapped to an access category representing the mobile-terminated access attempt. In the first example, the cause value may be set to the access category representing the mobile-terminated access attempt. The access category of the first example may comprise access category 0 if the first UE is in an NG-RAN cell.

In a second example of the second aspect, the access attempt comprises an access attempt for the call pull mapped to a cause value and/or a call type. In the second example, the message may further include the call type. In the second example, the cause value may comprise an RRC establishment cause value indicating the mobile-terminated access attempt and/or the call type may comprise a call type indicating terminating calls, if the first UE is in an E-UTRAN cell.

In a third example of the second aspect, the method further comprises providing, by the network to at least the UE, signaling for transfer of the call. The signaling may further be provided to a second UE and/or another UE between which the call is ongoing.

In a fourth example of the second aspect, the method further comprises forwarding messaging related to the call between the second UE and the other UE participating in the call prior to the transfer of the call.

In a fifth example of the second aspect, the method further comprises forwarding messaging related to the call between the UE and the other UE participating in the call responsive to the transfer of the call.

According to a third aspect, an apparatus in a user equipment (UE) comprises: at least one processor; and at least one memory including computer program code. The computer program code causes the apparatus, when executed with the at least one processor, to at least: indicate that a call pull is initiated; categorize an access attempt occurred for the call pull as a mobile-terminated access attempt; and make the access attempt by transmitting, to a network, a message to enable a process for the call pull. In some examples of the third aspect, the message may indicate the access attempt or the message may include a cause value set according to the categorization of the access attempt.

In a first example of the third aspect, the computer program code further causes the apparatus, when executed with the at least one processor, to at least: indicate that the call pull is initiated in response to determining that the call pull is initiated to pull, to the UE, a call from another user equipment (UE).

In a second example of the third aspect, the computer program code further causes the apparatus, when executed with the at least one processor, to at least: cause the access attempt to be considered not barred based on that the access attempt is categorized as the mobile-terminated access attempt.

In a third example of the third aspect, the cause value is set to an access category representing the mobile-terminated access attempt. The access category of the third example may comprise access category 0 if the first UE is in an NG-RAN cell.

In a fourth example of the third aspect, the message further includes a call type. The cause value of the fourth may comprise an RRC establishment cause value indicating the mobile-terminated access attempt and/or the call type of the fourth example may comprise a call type indicating terminating calls, if the first UE is in an E-UTRAN cell.

In a fifth example of the third aspect, the computer program code causes the apparatus, when executed with the at least one processor, to at least: indicate, from an upper layer of the apparatus to lower layers of the apparatus that the call pull is initiated.

In the fifth example, the computer program code causes the apparatus, when executed with the at least one processor, to at least: categorize, at the lower layers, the access attempt and make, at the lower layers, the access attempt.

In the fifth example, the lower layers comprise a first lower layer at which to categorize the access attempt and a second lower layer at which to make the access attempt. And, the computer program code may further cause the apparatus, when executed with the at least one processor, to at least: provide, from the first lower layer to the second lower layer, the access attempt categorized as the mobile-terminated access attempt.

In the fifth example, the upper layer comprises an application layer with an IP Multimedia Subsystem (IMS) client, the first lower layer comprises a Non-Access Stratum (NAS) layer and/or the second lower layer comprises an Access Stratum (AS) layer. The computer program code may further cause the apparatus, when executed with the at least one processor, to at least: authorize, by the AS layer, to pull the call.

In a sixth example of the third aspect, the computer program code may further cause the apparatus, when executed with the at least one processor, to at least: receive, from the network, signaling for transfer of the call. And, the computer program code may further cause the apparatus, when executed with the at least one processor, to at least: initiate the transfer of the call and provide, to the network, a response relating to the transfer of the call.

In a seventh example of the third aspect, the computer program code may further cause the apparatus, when executed with the at least one processor, to at least: perform, via the network, the call with another user equipment.

In an eighth example of the third aspect, the UE comprises a federated UE. The federated UE may be a UE in a group of UEs which are configured to use the same public user identity.

In a nineth example of the third aspect, the computer program code may further cause the apparatus, when executed with the at least one processor, to at least: send, from the UE to the other UE, an INVITE message. In the INVITE message, the Request-URI may be set to the URI in a target element of a remote element, a replaces header field containing dialog identifiers contained as attributes in a dialog element of a dialog-info element, and any other header field or body as determined by service logic. Also, the computer program code may further cause the apparatus, when executed with the at least one processor, to at least: learn about the call to pull by subscribing to a dialog event package and/or receiving, from the other UE, a response to the INVITE message. The response to the INVITE message may be a reply with 200 OK.

According to a variant of the third aspect, an apparatus in a user equipment (UE) comprises: at least one processor; and at least one memory including computer program code. The computer program code causes the apparatus, when executed with the at least one processor, to at least: indicate that a call pull is initiated; map an access attempt occurred for the call pull to indicate the access attempt to be mobile-terminated; and transmit a message indicating the access attempt toward a network.

In a first example of the variant of the third aspect, the computer program code causes the apparatus, when executed with the at least one processor, to at least: map the access attempt for the call pull to an access category representing that the access attempt is for mobile-terminated access. The access category of the first example may comprise access category 0 if the first UE is in an NG-RAN cell.

In a second example of the variant of the third aspect, the computer program code causes the apparatus, when executed with the at least one processor, to at least: map the access attempt for the call pull to a cause value and/or a call type. The cause value of the fourth may comprise an RRC establishment cause value indicating mobile-terminated access and/or the call type of the fourth example may comprise a call type indicating terminating calls, if the first UE is in an E-UTRAN cell.

According to a fourth aspect, an apparatus in a network comprises: at least one processor; and at least one memory including computer program code. The computer program code causes the apparatus, when executed with the at least one processor, to at least: receive, from a user equipment, a message including a cause value set according to categorization of an access attempt; and performing an access control based on the cause value. In a variant of the second aspect, the message indicates an access attempt and an access control is based on the indicated access attempt. The access attempt is for a call pull. And, the user equipment categorizes the access attempt as a mobile-terminated access attempt (i.e., the access attempt may be mapped to the mobile-terminated access attempt).

In a first example of the fourth aspect, the access attempt comprises an access attempt for the call pull mapped to an access category representing the access attempt mobile-terminated access attempt. In the first example, the cause value may be set to the access category representing the mobile-terminated access attempt. The access category of the first example may comprise access category 0 if the first UE is in an NG-RAN cell.

In a second example of the fourth aspect, the access attempt comprises an access attempt for the call pull mapped to a cause value and/or a call type. In the second example, the message may further include the call type. In the second example, the cause value may comprise an RRC establishment cause value indicating the mobile-terminated access attempt and/or the call type may comprise a call type indicating terminating calls, if the first UE is in an E-UTRAN cell.

In a third example of the fourth aspect, the computer program code may further cause the apparatus, when executed with the at least one processor, to at least: provide, to at least the UE, signaling for transfer of the call. The signaling may further be provided to a second UE and/or another UE participating in the call (i.e., between which the call is ongoing).

In a fourth example of the fourth aspect, the computer program code may further cause the apparatus, when executed with the at least one processor, to at least: forward messaging related to the call between the second UE and the other UE participating in the call prior to the transfer of the call.

In a fifth example of the fourth aspect, the computer program code may further cause the apparatus, when executed with the at least one processor, to at least: forward messaging related to the call between the UE and the other UE participating in the call responsive to the transfer of the call.

According to a fifth aspect, a method comprises: performing, in an apparatus of a second user equipment (UE), a call between the second UE and another user equipment (UE) via a network. The method may further comprise receiving, in the apparatus, an INVITE message from a first UE. The INVITE message relates to a pull of the call from the second UE to the first UE. In the INVITE message, the Request-URI may be set to the URI in a target element of a remote element, a replaces header field containing dialog identifiers contained as attributes in a dialog element of a dialog-info element, and any other header field or body as determined by service logic. The method may further comprise: sending, by the apparatus to the first UE, a response to the INVITE message. The response to the INVITE message may be a reply with 200 OK.

In an example of the fifth aspect, the method further comprises receiving, from the network, signaling relating to the pull of the call.

According to a sixth aspect, an apparatus in a user equipment (UE) comprises: at least one processor; and at least one memory including computer program code. The computer program code causes the apparatus, when executed with the at least one processor, to at least: perform a call between the UE and another user equipment (UE) via a network. The computer program code may further cause the apparatus, when executed with the at least one processor, to at least: receive an INVITE message from a federated UE. The INVITE message relates to a pull of the call from the UE to the federated UE. In the INVITE message, the Request-URI may be set to the URI in a target element of a remote element, a replaces header field containing dialog identifiers contained as attributes in a dialog element of a dialog-info element, and any other header field or body as determined by service logic. The computer program code may further cause the apparatus, when executed with the at least one processor, to at least: send, to the federated UE, a response to the INVITE message. The response to the INVITE message may be a reply with 200 OK.

In an example of the sixth aspect, the computer program code further causes the apparatus, when executed with the at least one processor, to at least: receive, from the network, signaling relating to the pull of the call.

According to a seventh aspect, an apparatus comprises: means for indicating that a call pull is initiated; means for categorizing an access attempt occurred for the call pull as a mobile-terminated access attempt; and means for making the access attempt to a network by transmitting a message to enable a process for the call pull. In some examples of the seventh aspect, the message may indicate the access attempt or the message may include a cause value set according to the categorization of the access attempt.

In examples of the seventh aspect, the apparatus further comprises means to implement one or more of the examples according to the first aspect and/or the variant of the first aspect.

According to an eighth aspect, an apparatus in a network comprises: means for receiving, from a user equipment, a message including a cause value set according to categorization of an access attempt; and means for performing an access control based on the cause value. In a variant of the eighth aspect, the message indicates an access attempt and an access control is based on the indicated access attempt. The access attempt is for a call pull. And, the user equipment categorizes the access attempt as a mobile-terminated access attempt (i.e., the access attempt may be mapped to the mobile-terminated access attempt).

In examples of the eighth aspect, the apparatus further comprises means to implement one or more of the examples according to the second aspect.

According to a nineth aspect, a system comprises a first user equipment with the apparatus according to the examples of the third aspect and a second user equipment with the apparatus according to the examples of the sixth aspect, connected via a network according to the examples of the fourth aspect.

According to a tenth aspect, a computer program product comprises program instructions stored on a computer readable medium to execute the method according to the first and/or second aspect and/or the fifth aspect when said program is executed on a computer.

The foregoing description has provided by way of non-limiting examples a full and informative description of the example embodiments of the subject disclosure. However, various modifications and adaptations may become apparent to those skilled in the relevant arts in view of the foregoing description, when read in conjunction with the accompanying drawings and the claims. However, modifications of the teachings described herein will still fall within the scope of the subject disclosure as defined in the claims. Indeed, there is a further example embodiment comprising a combination of one or more example embodiments with any of the other example embodiments previously discussed.

The invention claimed is:

1. A method for a first user equipment (UE), the method comprising:

indicating, by the first UE, that a call pull is initiated based on determining that the call pull is initiated to pull, to the first UE, a call from a second user equipment (UE);

categorizing, by the first UE, an access attempt occurred for the call pull as a mobile-terminated access attempt;

causing, by the first UE, the access attempt to be considered not barred in response to the access attempt being categorized as the mobile-terminated access attempt; and performing, by the first UE, the access attempt to a network by transmitting a message to enable a process for the call pull, wherein the message includes a cause value set according to the categorization of the access attempt, and wherein the cause value is set a value representing the mobile-terminated access attempt.

2. The method of claim 1, wherein the cause value is set to the value if the first UE is in an NG-RAN cell.

3. The method of claim 1, wherein the message further includes a call type.

4. The method of claim 3, wherein the cause value comprises an RRC establishment cause value indicating the mobile-terminated access attempt and/or the call type comprises a call type indicating terminating calls, if the first UE is in an E-UTRAN cell.

5. The method of claim 1, wherein indicating that a call pull is initiated comprises indicating, from an upper layer of the first UE to lower layers of the first UE that the call pull is initiated.

6. The method of claim 5, wherein categorizing the access attempt comprises categorizing, at the lower layers, the access attempt and making the access attempt comprises making, at the lower layers, the access attempt.

7. The method of claim 6, wherein the lower layers comprise a first lower layer at which to categorize the access attempt and a second lower layer at which to make the access attempt, and wherein the method further comprises providing, from the first lower layer to the second lower layer, the access attempt categorized as the mobile-terminated access attempt.

8. The method of claim 7, wherein the upper layer comprises an application layer with an IP Multimedia Subsystem (IMS) client, the first lower layer comprises a Non-Access Stratum (NAS) layer and/or the second lower layer comprises an Access Stratum (AS) layer.

9. A non-transitory computer-readable medium comprising a computer program encoded thereupon, the computer program comprising instructions that, when executed in hardware, perform the method of claim 1.

10. A method for an apparatus, the method comprising:

receiving, from a user equipment, a message to enable a process for a call pull based on determining that the call pull is initiated to pull, from the apparatus, a call to the user equipment including a cause value set according to categorization of an access attempt; and performing an access control based on the cause value, wherein:

the access attempt is for a call pull; and the access attempt is categorized as a mobile-terminated access attempt.

11. A non-transitory computer-readable medium comprising a computer program encoded thereupon, said computer program comprising instructions that, when executed in hardware, perform the method of claim 10.

12. A first user equipment (UE), the first UE comprising:

at least one processor; and at least one memory storing computer program code that, when executed with the at least one processor, causes the first UE at least to:

indicate that a call pull is initiated based on determining that the call pull is initiated to pull, to the first UE, a call from a second user equipment (UE);

categorize an access attempt occurred for the call pull as a mobile-terminated access attempt;

cause the access attempt to be considered not barred in response to the access attempt being categorized as the mobile-terminated access attempt; and perform the access attempt to a network by transmitting a message to enable a process for the call pull, wherein the message includes a cause value set according to the categorization of the access attempt, and wherein the cause value is set to a value representing the mobile-terminated access attempt.

13. The first UE of claim 12, wherein the cause value is set to the value if the first UE is in an NG-RAN cell.

14. The first UE of claim 12, wherein the message further includes a call type.

15. The first UE of claim 14, wherein the cause value comprises an RRC establishment cause value indicating the mobile-terminated access attempt and/or the call type comprises a call type indicating terminating calls, if the first UE is in an E-UTRAN cell.

16. The first UE of claim 12, wherein the computer program code further causes the first UE, when executed with the at least one processor, at least to:

indicate, from an upper layer of the first UE to lower layers of the first UE that the call pull is initiated.

17. The first UE of claim 16, wherein the computer program code further causes the first UE, when executed with the at least one processor, at least to:

categorize, at the lower layers, the access attempt and perform, at the lower layers, the access attempt.

18. The first UE of claim 17, wherein the lower layers comprise a first lower layer at which to categorize the access attempt and a second lower layer at which to make the access attempt, and wherein the computer program code further causes the first UE, when executed with the at least one processor, at least to:

provide, from the first lower layer to the second lower layer, the access attempt categorized as the mobile-terminated access attempt.

19. The first UE of claim 18, wherein the upper layer comprises an application layer with an IP Multimedia Subsystem (IMS) client, the first lower layer comprises a Non-Access Stratum (NAS) layer and/or the second lower layer comprises an Access Stratum (AS) layer.

20. An apparatus comprising:

at least one processor; and at least one memory storing computer program code that, when executed with the at least one processor, causes the apparatus at least to:

receive, from a user equipment, a message to enable a process for a call pull based on determining that the call pull is initiated to pull, from the apparatus, a call to the user equipment including a cause value set according to categorization of an access attempt; and perform an access control based on the cause value, wherein:

the access attempt is for a call pull; and the access attempt is categorized as a mobile-terminated access attempt.

21. The method of claim 1, wherein the value is 0.

* * * * *